(No Model.) 2 Sheets—Sheet 1.
H. SECK.
MACHINE FOR SEPARATING LIGHT AND HEAVY SUBSTANCES.
No. 316,190. Patented Apr. 21, 1885.
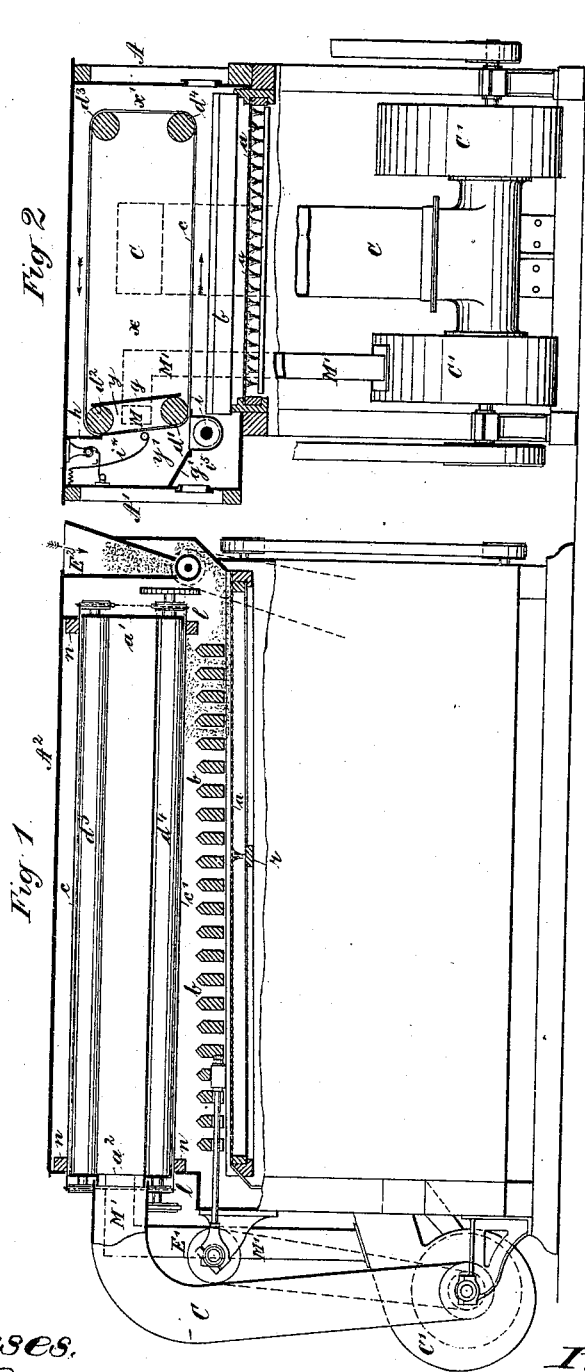
Witnesses.
Inventor,
Heinrich Seck,
By James L. Norris.
Atty.

(No Model.)　　　　　　　　　　　　　　　　2 Sheets—Sheet 2.
H. SECK.
MACHINE FOR SEPARATING LIGHT AND HEAVY SUBSTANCES.
No. 316,190.　　　　　　　　　　Patented Apr. 21, 1885.
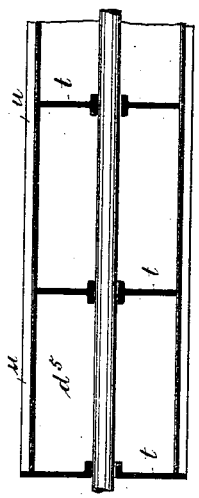
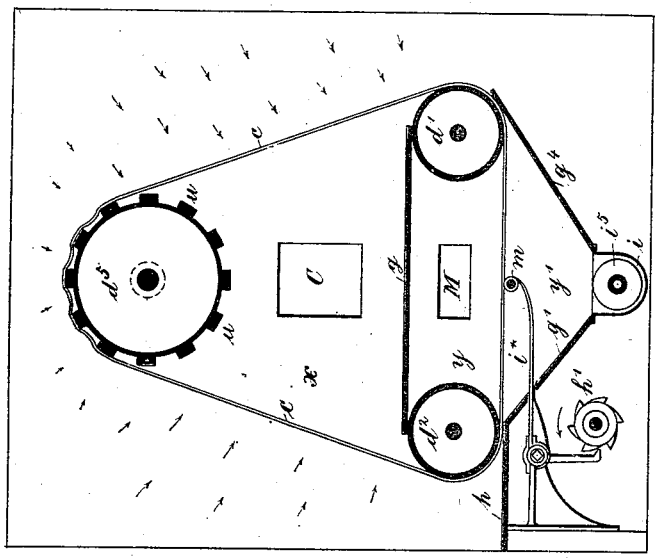
Witnesses,
J. A. Rutherford
Robt Everett
Inventor,
Heinrich Seck,
By James L. Norris.
Atty.

UNITED STATES PATENT OFFICE.

HEINRICH SECK, OF DRESDEN, SAXONY, GERMANY.

MACHINE FOR SEPARATING LIGHT AND HEAVY SUBSTANCES.

SPECIFICATION forming part of Letters Patent No. 316,190, dated April 21, 1885.

Application filed November 6, 1884. (No model.)

*To all whom it may concern:*

Be it known that I, HEINRICH SECK, of the city of Dresden, in the Kingdom of Saxony and German Empire, have invented a certain new and useful Improvement in Machines for Separating Light and Heavy Substances, of which the following is a specification, reference being had to the accompanying drawings, and to the letters of reference marked thereon.

This invention relates to apparatus for separating, by means of air-suction and a traveling endless filtering-cloth, light and heavy substances, and is more particularly intended for the purification of grits and middlings in the manufacture of flour, as in an apparatus the subject-matter of United States Patent No. 306,648, granted to me on the 14th day of October, 1884.

The object of the present invention is to facilitate the separation of the matters adhering to the endless traveling filtering-cloth; to provide a novel arrangement of such filtering-cloth, in connection with a suction apparatus, for drawing the dust onto the filtering-cloth, and a dead-air chamber, a direct-blast apparatus, and knocking devices for removing the matters adhering to the filtering-cloth, as will be hereinafter more fully described, and then claimed.

In the accompanying drawings, Figure 1 is a side view, partly in section, of an apparatus for purifying grits and middlings, showing part of the improvements. Fig. 2 is an end view of the same, partly in section. Fig. 3 is a view showing the filtering-cloth when employed as a dust-collector; and Fig. 4 is a view of a portion of one of the improved guide-rollers over which the filtering-cloth is made to run in some cases, preferably when employed for collecting the dust from dust-chambers, as shown in Fig. 3.

$c$ indicates the moving endless filtering-cloth; $x$, the suction-space within the latter, and $y$ the space which is not disturbed by the air-suction.

M indicates an opening in the end plate, $a^2$, closing one end of the space $y$, and $M'$ an air-conduit connecting the said space $y$ with a fan or blower, $C'$, through the said opening M. A current of air is introduced into the space $y$ for a purpose hereinafter described.

The dust or other light matter adhering to and carried along by the moving filtering-cloth is beaten off by the beaters $i^*$, arranged within the space $y'$, through which no air-current passes, and striking against that portion of the filtering-cloth $c$ passing before the said space $y$, as described in the said former patent. I have found in practice that after a continued use of the filtering-cloth the particles of dust or other light matter entering the meshes or interstices of the filtering-cloth are not beaten off by the beaters, and will gradually fill up the said interstices and interfere with the passage of the air-current through the said cloth. In order to remove this difficulty, I introduce a current of air into the space $y$ through the conduit $M'$ and opening M, and as the said space $y$ is closed on all sides except at M, the air blown into the said space is compelled to pass out through the meshes or interstices of that portion of the cloth $c$ passing before the space $y$. By introducing air under a certain pressure into the space $y$ the portion of the cloth opposite the said space will stretch, like an air-cushion, thus slightly enlarging the meshes of the cloth, and at the same time the particles of dust which have entered the said meshes will be blown out, thus cleaning the latter, so that at the end of each revolution the filtering-cloth will commence to pass before the suction-chamber in a thoroughly cleaned condition. As the portion of the cloth $c$ passing before the space $y$ is stretched by the air, as above stated, the dust or other matter adhering to the said cloth will come off more readily than heretofore when the beaters $i^*$ strike against the said portion.

When the filtering-cloth is used in a machine for purifying grits and middlings, and is arranged directly over the rocking sieve $a$, as shown in Figs. 1 and 2 of the drawings, and as fully described in the said former patent, I may in some cases substitute for the grate of grooved bars there described a similar grate of bars, $b$, having a projecting ridge of acute angular or convexed form, the said bars $b$ being arranged either longitudinally or transversely to the filtering-cloth $c$ and covering up about one-half of the open area between the said filtering-cloth and the rocking sieve. The ridged bars $b$ may either be connected with the rocking sieve and partake in the rocking movement of the latter, as described in the said former patent, or they may be rigidly secured to the frame of the machine and form a stationary grate between the rocking sieve and the moving filtering-cloth. The object of the modified form of grate is only to compress or intensify the current of air passing through the said rocking sieve, so as to cause all the light substances once carried above the said grate to adhere to and be removed by the moving cloth $c$, (so that they will be prevented from falling back on the rocking sieve,) and not to separate from them the heavier particles, as described in the said former patent.

When employing the said filtering-cloth $c$ in a dust-chamber for the purpose of collecting the dust, (as shown in Fig. 3 of the drawings, in which the space not disturbed by the suction-air is formed by the plates $g, h, g'$, and $g^4$ and the trough $i$ of the conveyer $i^5$, and as will be readily understood from the said Patent No. 306,648,) a greater suction-area of the said cloth $c$, and a better frictional contact of the latter with the guide-rollers than heretofore, may be obtained by substituting for the two rollers $d^3$ and $d^4$, Fig. 2, a single roller, $d^5$, and making the latter hollow and open, so as to allow the suction-air to act through the same upon the filtering-cloth $c$.

The roller $d^5$, part of which is shown in detail in Fig. 4, consists for the said purpose of a suitable number of disks, $t$, upon which are screwed narrow bars or boards placed edgewise, or thick bars or plates $u$, laid flat upon the circumference of the said disks $t$, so that open spaces will remain between the said boards or plates $u$.

As will be seen from Fig. 3 of the drawings, the air-suction will draw in the dust through the open spaces between the several plates or boards and disks of the roller $d^5$, and also cause the filtering-cloth passing over the said roller to slightly enter the said spaces, so as to prevent it from slipping.

I am aware that it is not new to provide as a dust-collector for mills a rotary drum covered with a screening material, and adapted to rotate through a suction-chamber in which the material or dust is taken up by the drum, and having a portion of the surface of the said drum passing continuously over a dead-air chamber in which the matters adhering to the drum are removed by a direct blast and a knocking device.

Having thus described my invention, what I claim as new, and desire to secure by Letters Patent, is—

1. In a machine for separating light and heavy substances by means of air-suction, the combination of the suction-casing, the continuously-traveling endless filtering-cloth arranged within said casing, rollers within said cloth for the latter to travel over, a plate within said cloth bearing against two of said rollers to form a chamber between the plate and cloth isolated from the other portion of the cloth, plates outside of the cloth and said two rollers to form a space, $y'$, opposite to space $y$, and isolated from the suction portion of the casing, an air-blast conduit leading into said space $y$, and a beater within said space $y'$, to strike said cloth, substantially as described.

2. In a machine for separating light and heavy substances by means of air-suction, the combination, with the suction-casing, the traveling endless filtering-cloth arranged within said casing and moving transversely of the length of the machine, and a shaking screen arranged immediately below the traveling cloth, of a dead-air chamber arranged at the side of the machine, guide-rollers for conducting the filtering-cloth past the dead-air space, a direct-blast apparatus for discharging air upon the inner side of the filtering-cloth while passing said dead-air chamber, and a knocking device for removing the matters adhering to the cloth and loosened by the air-blast, substantially as described.

3. In a machine for separating light and heavy substances by means of air-suction, the combination, with the traveling endless filtering-cloth, the air-compressing grate arranged directly beneath the latter, and the shaking sieve arranged beneath the grate, of a suction-casing containing the filtering-cloth, a dead-air chamber, rollers for conducting the filtering-cloth over or past the same, and a direct-blast apparatus for loosening the matters adhering to the cloth, substantially as described.

In testimony whereof I have signed my name to this specification in the presence of two subscribing witnesses.

HEINRICH SECK.

Witnesses:
PAUL DRUCKMÜLLER,
CARL SCHRÖDER.